Oct. 23, 1962 W. KRAUSKOPF 3,059,360
DEVICE FOR INTERMITTENTLY MOVING A SLIDE MAGAZINE
Filed Nov. 29, 1960 4 Sheets-Sheet 1
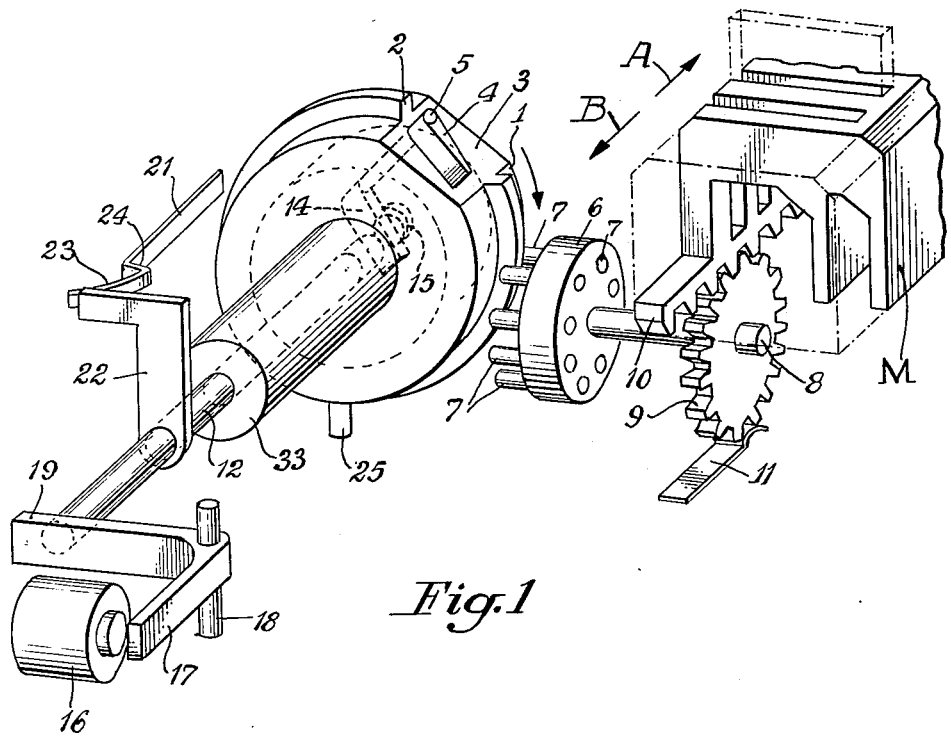
*Fig.1*
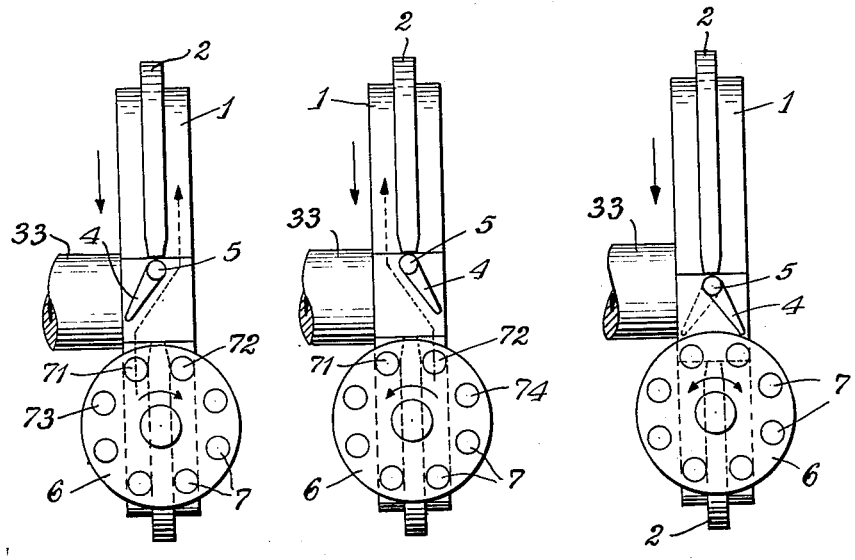
*Fig.2a*  *Fig.2b*  *Fig.3*

Oct. 23, 1962   W. KRAUSKOPF   3,059,360
DEVICE FOR INTERMITTENTLY MOVING A SLIDE MAGAZINE
Filed Nov. 29, 1960   4 Sheets-Sheet 2

Oct. 23, 1962   W. KRAUSKOPF   3,059,360
DEVICE FOR INTERMITTENTLY MOVING A SLIDE MAGAZINE
Filed Nov. 29, 1960   4 Sheets-Sheet 3

United States Patent Office 3,059,360
Patented Oct. 23, 1962

3,059,360
DEVICE FOR INTERMITTENTLY MOVING A SLIDE MAGAZINE
Wilhelm Krauskopf, Kiel, Germany, assignor to Zeiss Ikon Aktiengesellschaft, Stuttgart, Germany
Filed Nov. 29, 1960, Ser. No. 72,433
Claims priority, application Germany Dec. 5, 1959
13 Claims. (Cl. 40—79)

The invention relates to a device for intermittently moving a slide magazine selectively in opposite directions in preferably motor driven slide projectors.

In the known motor driven slide changers the movement impulses coordinated to the change of slides are transmitted by a rotary drive member and lever systems or control drums to the change members which seize the individual slide to be projected. The advancement of the magazine housing containing the slides in individual compartments is effected during the changing procedure by means of a gear segment engaging a rack on the magazine housing, which rack by means of gearings or suitable lever transmissions is in operative connection with the drive of the slide changer.

All these devices require for the intermittent movement of the slide magazine relatively elaborate mechanical means in which for the purpose of changing the direction of the movement of the magazine housing the direction of rotation of the rotary drive means for the respective slide changers has to be reversed. This makes it necessary to provide the slide changer with a special reversing gearing which is inserted into the drive gearing of the slide changer, or to drive the slide changer by a motor adapted to be reversed in its direction of rotation.

It is an object of the present invention to eliminate the excessive use of switch and control means. For the purpose of intermittently moving a slide magazine selectively in directions opposite to one another, the device according to the invention is provided with a control drum rotating only in one direction and having arranged on it one or more adjustable control cams which, according to their selected operative position, move a control element effecting the movement of the magazine in equal steps which may be executed oppositely for the advance and reverse movements, respectively.

It is an advantageous feature of the invention to have each adjustable control cam of the device pivotally arranged at the control drum and preferably at its periphery. According to another feature of the invention, the adjustable control cams cooperate with a control disc which is rotated by each individual cam about equal angles of rotation in a direction dependent upon the operative position of the control disc. The engagement means of the control disc are arranged at its front area facing the control drum and are formed preferably by an annular series of pins which is concentrically arranged about the axis of the control disc, while the longitudinal axes of these pins are arranged preferably parallel to each other.

In this type of control element each control cam arranged at the rotating control drum enters, depending upon its operative position, the space between the pin next to it and the following pin either of the left hand half or of the right hand half of the annular series of pins, whereby due to the inclined position of the control cam to the contact zone these pins are moved either to the left or to the right and thus rotate the control disc one step, which is equal to the distance between two pins, clockwise or anti-clockwise, respectively.

In order to avoid an undesired movement of the control element, which is in engagement with a cam only during the step by step movement, a special locking arrangement is provided which locks the control element in its operative position before or after each step, respectively. For this purpose may be employed, for instance an annular collar arranged on the control drum and this collar in place of a control cam engages the control disc during the rotation of the drum as soon as the cam has completed its step-like movement. In place of this collar or additionally to it may also be provided a spring latch which by simultaneous acting upon the rack gearing of the magazine housing also secures the individual operative positions of the slide magazine, in which each slide to be projected has to lie in the operative plane of the slide changer of the projector.

In the following is described one embodiment of the invention with reference to the accompanying drawings, in which:

FIG. 1 is a perspective view of the magazine advancing device;

FIGS. 2a and 2b show the cooperation of the control drum with the control disc in the operative positions of the control cam;

FIG. 3 illustrates the freewheeling position of the control disc;

Figure 4:
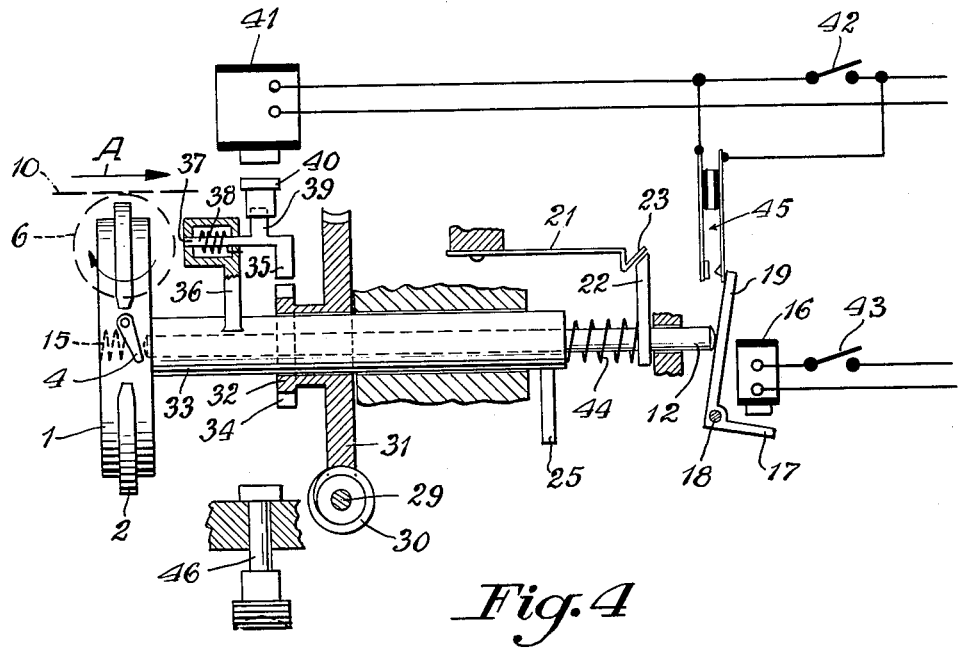
FIGS. 4, 5 and 6 illustrate each a different operative position of the advancing device.
Figure 5:
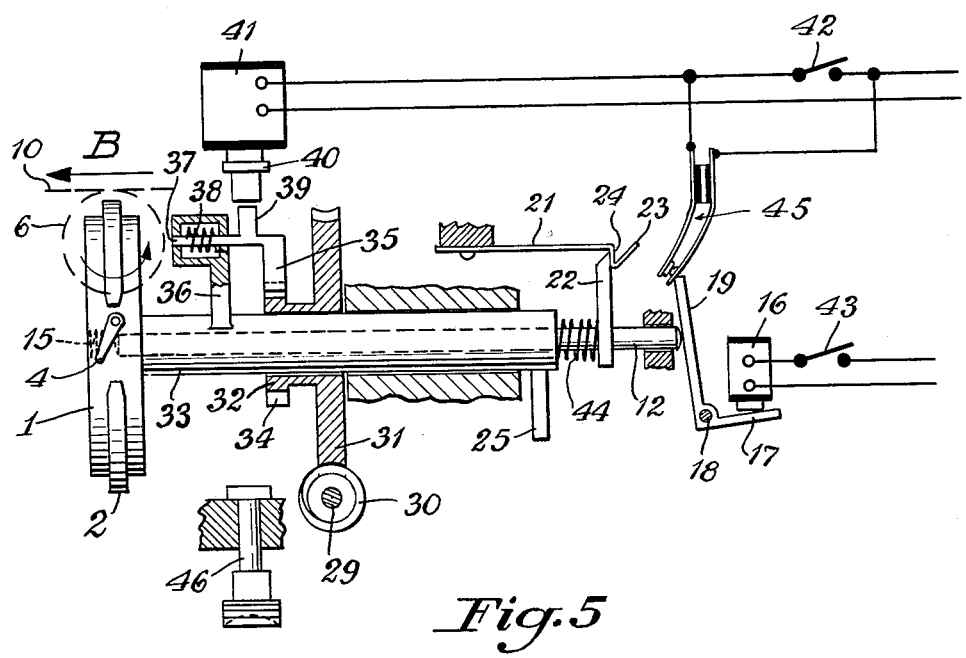
Figure 6:
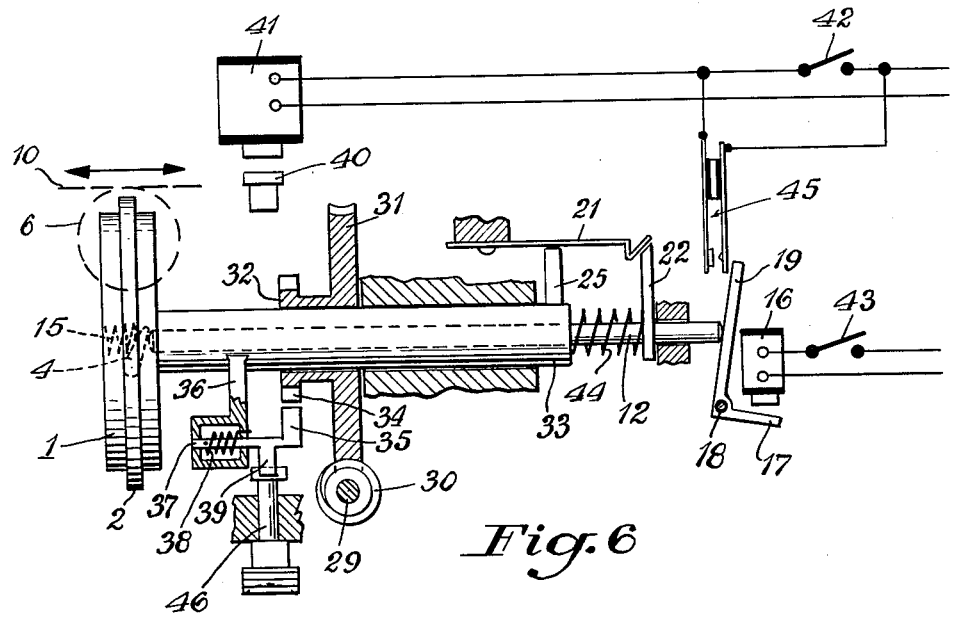
Figure 7:
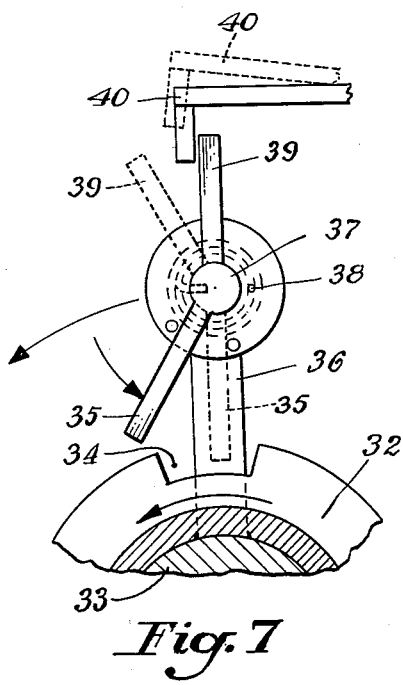
FIG. 7 illustrates in an enlarged scale the pawl provided for coupling the control drum with the motor drive.
Figure 8:
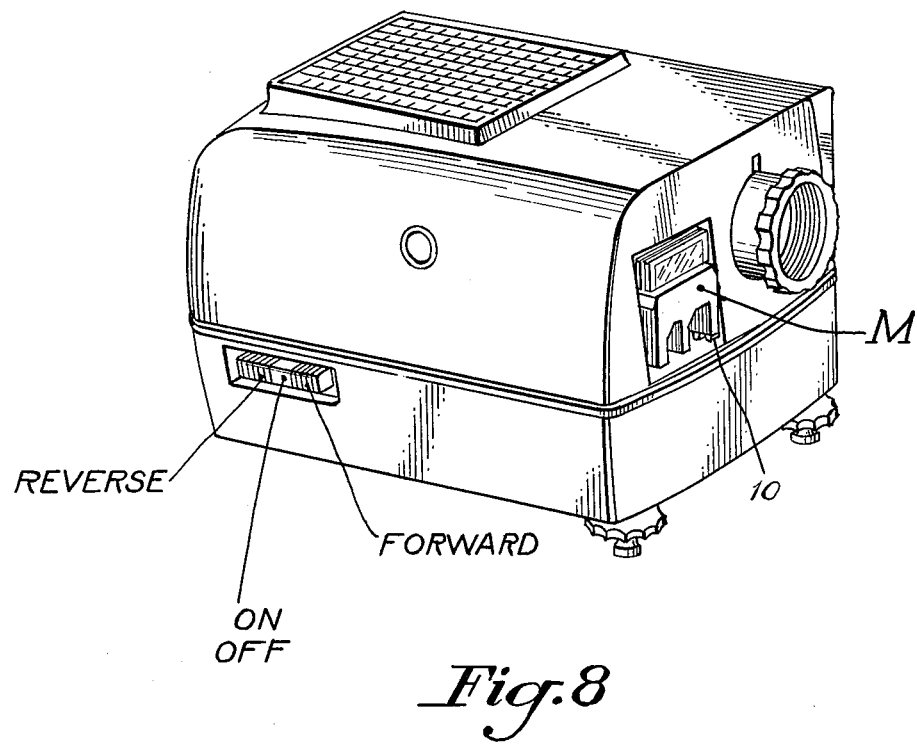
FIG. 8 illustrates a slide projector equipped with a slide changer, a slide magazine and a device for moving the slide magazine step by step.

Referring to FIGS. 1 to 3, the rotary control drum 1 is provided at its periphery at 3, in the plane of its collar 2, with an adjustable control cam 4. One end of this control cam 4 is pivotally mounted about an axis 5 extending into the drum 1 so that it lies approximately tangentially on the periphery of the control drum 1 and, according to its operative positions, either at the left hand side or at the right hand side of the collar 2 on the drum 1.

The perimeter of the control drum 1 engages a control disc 6 having an annular series of pins 7 on its face which is directed toward the drum 1. This control disc 6 is operatively connected with the rack bar 10 of the magazine housing by means of a shaft 8 and a gear 9 thereon which are adapted to move a slide magazine M coupled with the change device, so that by turning the control disc 6 about the distance between two pins the slide magazine M will be advanced about one slide. The gear 9 does not only engage the rack bar 10 of the magazine housing, but is also engaged by a leaf spring 11 acting as a latch.

During the rotation of the control drum 1 in the direction of the arrow the control disc 6 at first is locked by the pins 71 and 72 of the annular series of pins 7 (see FIGS. 2a and 2b). These two pins engage the opposite sides of the collar 2. When now as a result of the rotation of the drum 1 the pins 7 of the control disc 6 extend into the region of the control cam 4, the pin 71 by means of the control cam 4, which is in an operative position according to FIG. 2a, is moved clockwise by one pin graduation, since at this portion of the periphery of the drum 1 the collar 2 is interrupted. The pin 71 hereby slides along the right hand side of the control cam 4 and comes to rest at the right hand side of the collar 2. The pin 73 which follows the pin 71 slides during this rotative movement along the left side of the control cam 4, thereby preventing a further rotating of the control disc 6, and comes to occupy the prior position of the pin 71 at the left hand side of the collar 2 until after a further rotation of the control drum 1 the pin 73 is moved by the control cam 4 in the manner just described.

If, however, the control cam 4 is in the operative position shown in FIG. 2b, then during the rotation of the control drum 1 in the same direction indicated by the arrow, the pin 72 of the series of pins 7 is rotated anticlockwise by the control cam 4, so that it comes to lie to the left hand side of the collar 2. The pin 74 which follows the pin 72 slides during this movement along the right hand side of the cam 4 and thereafter occupies the former position of the pin 72 at the right hand side of the collar 2.

Hence, while the direction of rotation of the control drum 1 remains the same, the control disc 6 is rotated by the control cam 4, which engages the series of pins 7 of the control disc 6, either in one direction or the other according to the selected positions of the control cam 4 as illustrated in FIGS. 2a and 2b, so that a slide magazine M coupled with the control disc 6 is moved either in the direction of the arrow A or in the direction of the arrow B (FIG. 1). The size of the advancing step is determined by the diameter and the tooth pitch of the gear 9 mounted on the shaft 8 of the control disc 6, which gear 9 also meshes with the rack bar 10 on the magazine housing. The leaf spring 11, which engages the gear 9, releasably locks the slide magazine M in the different operative positions which permit each single slide to be projected to lie in the picture window plane of the slide changer of the projector.

The control cam 4 on the drum 1 is switched into its two operative positions illustrated in FIGS. 2a and 2b by means of a longitudinally slidable tripping rod 12 which is expediently arranged coaxially with the drum 1. The pivot axis 5 of the control cam 4 has fastened to its inner end an arm 14 which under the action of a pressure spring 15 abuts against one end of the tripping rod 12. FIG. 1 shows the normal position of the tripping rod 12 in which the control cam 4 assumes the operative position according to FIG. 2a. For switching the control cam 4 the tripping rod 12 is lengthwise displaced to the right either manually or by a preferably magnetic coupling. For this purpose a control magnet 16 is briefly excited so that its core attracts the armature 17. This armature 17 pivots about an axis 18 in clockwise direction and thereby pushes with its leg 19 against the other end of the tripping rod 12 so that the latter is moved toward the right. The tripping rod 12 rotates the arm 14 against the tension of the spring 15 in the same direction about the axis 5 with the result that the control cam 4, which rotates with the axis 5, is switched into its operative position shown in FIG. 2b.

For locking the tripping rod 12 and therewith also the control cam 4 in this operative position, there is provided a stationary latching spring 21 which cooperates with a latching arm 22 arranged at the tripping rod 12. In displacing the tripping rod 12 by the magnet armature 17, 19, the latching arm 22 attached to the tripping rod 12 engages the end portion 23 of the latching spring 21. Hereby the latching spring 21 is pushed back until finally, in the end position of the rod 12, the end portion 23 of the latching spring 21 which is provided with a rectangular offset 24, moves in front of the arm 22 and thus prevents its return to its initial position. The tripping rod 12 is now locked in a position which determines the second operative position of the control cam 4. Consequently, the control magnet 16 needs to be excited only for the purpose of switching the control cam 4 from its position shown in FIG. 2a to a position shown in FIG. 2b, since in the last named position the cam 4 is locked by the latching means 21 and 22.

The lifting of the latching spring 21 from the latching arm 22 for the purpose of moving the control cam 4 into its operative position shown in FIG. 2a may be effected by some conventional device (not shown) which is operated from the outside. However, if it is necessary to have the control cam 4 return to its initial position shown in FIG. 2a for performing the next change step, then the latching spring 21 during the rotation of the control drum 1 may be raised from the region of the latching arm 22 on the tripping rod 12 by a cam 25 arranged on the control drum 1, so that the tripping rod 12 is released and the control cam 4 under the action of the pressure spring 15 is returned to its operative position shown in FIG. 2a in order to engage the control disc 6 anew.

The FIGS. 4 to 7 illustrate the coupling of the control drum 1 with the drive means of the projector. The drive shaft 29 of a motor (not shown), which simultaneously may be employed for generating a cool air stream, rotates continuously a worm 30. This worm 30 drives a worm gear 31 rigidly connected to a coupling disc 32 which is loosely rotatably mounted on the tubular shaft 33 of the control drum 1. The periphery of the coupling disc 32 is provided with notches 34 which are engaged by a pawl 35 arranged on a cantilever arm 36 of the tubular shaft 33 of the control drum 1. The pawl 35 is acted upon by a spring 38 wound about the shaft 37 of the pawl 35. The spring 38 seeks to pivot the pawl 35 into the region of the periphery of the continuously rotating coupling disc 32. This, however, is prevented by the armature 40 of an electromagnet 41 (FIGS. 4 and 7) which engages a nose 39 of the pawl 35. The control disc 6 meshing with the control drum 1 is arranged in back of the control drum 1 and is indicated by dashed lines in the FIGS. 4 to 6. Thus, the control cam 4 during the rotation of the drum 1 in the direction of the arrow engages the pins 7 of the control disc 6 from below. The position illustrated in FIGS. 4 and 5 corresponds to the operative position of the change mechanism which is, for instance, coupled with the shaft 33 of the drum 1. For advancing the slide magazine M in the direction of the arrow A the coupling magnet 41 is being excited for a short period by actuating the switch button 42, so that the magnet 41 attracts the armature 40 which thereby releases the nose 39 of the pawl 35 so that the latter under the action of the torsion spring 38 is able to swing about its axis 37 into the region of the coupling discs 32. Thus, by the engagement of the pawl 35 with one of the notches 34 of the coupling disc 32 the coupling of the control drum 1 with the continuously rotating drive means 30, 31 of the projector is established. The control drum 1 is then taken along for one rotation by the coupling disc 32. After a half rotation of the drum 1 the control cam 4 engages from below the pins 7 of the central disc 6 and rotates the same one pin graduation in clockwise direction so that the slide magazine M, whose rack bar 10 is indicated by a dashed line in the FIGS. 4 to 6, and which is geared to the control disc 6, is advanced in the direction of the arrow A (FIG. 4).

Upon completion of one rotation of the control drum 1, the nose 39 of the pawl 35 meshing with the coupling disc 32 strikes the armature 40, which has meanwhile dropped from the coupling magnet 41, whereby the pawl 35 against the action of the torsion spring 38 is pivoted out of the respective notch 34 of the coupling disc 32. Thus, the control drum 1 comes to a standstill after one rotation until after the projection of the slide in the picture window of the projector the switch button 42 is again actuated and the next advancement of the slide magazine is therewith initiated.

If the direction of movement of the slide magazine is to be reversed (FIG. 5), then a switch button 43 instead of the switch button 42 is actuated, so that the control magnet 16 is excited (FIG. 1). The control magnet 16 now attracts the armature 17 which pivots about the axis 18 and with its leg 19 displaces the tripping rod 12 to the left against the action of the pressure spring 44. During this procedure the tripping rod 12 arranged within the tubular shaft 33 of the control drum 1 moves by means of the above mentioned members 5, 14 the control cam 4 into its second operative position (FIG. 1). At the same time the leg 19 of the armature 17 closes a switch contact 45 arranged in a circuit parallel to the switch button 42 whereby the magnet 41 is excited which attracts its armature 40, so that the control drum 1 is now coupled for one rotation with the coupling disc 32 by means of the pawl 35 as described heretofore. After a one half rotation of the control drum 1—i.e. after the change mechanism of the projector has the projected slide returned to the magazine—the control cam 4 locked by the leaf spring 21 in its second operative position according to FIG. 5, again engages from below the control disc 6 arranged behind the control drum 1, whereby the control disc 6 is moved by the cam 4 one pin graduation counter-clockwise, so that a slide magazine coupled with the control disc 6 by the rack bar 10 is moved in the direction of the arrow B. Upon the completion of theis procedure, the control cam 4 returns to its first operative position shown in FIG. 4. This is effected, as already explained in the description of FIG. 1, by a cam 25 on the control drum 1, which cam 25, after the control cam 4 has withdrawn from the region of the pins 7 of the control disc 6, strikes against the resilient latch spring 21 and lifts the same from the latching arm 22 of the tripping rod 12. The tripping rod 12 under the action of the pressure spring 44 can now return to its initial position, while under the action of the pressure spring 15 (FIG. 1) the control cam 4 following the movement of the tripping rod 12 also returns to its first operative position.

In order to stop the control drum 1 in the so-called one half rotative position, during which the change mechanism of the slide changer does not engage the slide magazine, there is provided a locking member 46 slidably arranged in a stationary guide. This slidable locking member 46 may, for instance, be manually moved into the region of the pawl 35 mounted on the shaft 33 of the drum.

After a one half rotation of the control drum 1 coupled with the disc 32 by the above described means, the nose 39 of the pawl 35 engages the locking member 46. Thereby the pawl 35 due to the cooperation of its nose 39 with the armature 40 is pivoted about its axis 37 against the action of the spring 38 and is lifted from the respective notch 34 of the coupling disc 32. Thus the control drum 1 is stopped after a one half rotation.

In this condition the control cam 4 is positioned at the periphery of the control drum 1 shortly before its engagement with the pins 7 on the control disc 6 (FIG. 3). The annular series of pins 7 thereby is freely rotatable between the control cam 4 and the collar 2 protruding from the periphery of the control drum 1. This position corresponds to the condition of one half rotation, in which the control dis 6 is uncoupled from the control drum 1 so that now the slide magazine is freely movable within the guide of the projector assigned to it and may, for instance, be taken out of this guide and be replaced by another magazine. The gear position of the control disc 6 and also the proper position of the slide magazine with respect to the switch plane of the change mechanism of the projector is maintained and secured by the leaf spring 11 (FIG. 1) which acts—also during the movement of the slide magazine—upon the gear 9 and therewith also indirectly upon the rack bar 10.

If the projection is to be continued after an arbitrary movement of the slide magazine or after the insertion of a new magazine, respectively, the locking member 46 is removed from the regision of the pawl 35. Thereupon, after the nose 39 has been released, the pawl 35 engages a notch 34 of the coupling disc 32 whereby the control drum 1 is rotated one half circle until the pawl 35 again strikes the armature 40 of the coupling magnet 41. This position of the control drum 1 again corresponds to the operative position of the projector. Now the slide magazine may again be intermittently moved in the directions A or B in a manner as described above by actuating the switch buttons 42 or 43, respectively.

In order that also at an extended pressing of the buttons 42 or 43 the armatures 40 or 17, respectively, may drop from the coupling magnet 41 or the control magnet 16, respectively, before the control drum 1 has completed one rotation, both the magnets 41 and 16 may be provided with means (not illustrated) which interrupt automatically the circuits of these magnets after a predetermined time.

What I claim is:

1. In a device for intermittently moving a slide magazine provided with a rack bar thereon and arranged on a slide projector, a rotary control drum, means for rotating said drum in one direction, a control cam pivotally mounted on the circumference of said control drum and extending in circumferential direction of the same, a control disc rotatably mounted adjacent said control drum about an axis extending at right angles to the axis of rotation of said control drum and adapted to be rotated step by step by said control cam upon rotation of said control drum, said control disc having on the face directed toward said control drum an annular series of circumferentially spaced pins adapted to be engaged by said control cam, means for adjusting said control cam selectively into two different positions in one of which said control disc is rotated in one direction, while in the other position of said control cam the control disc is rotated in the opposite direction, and gear means operatively connecting said control disc with said rack bar provided on said slide magazine, whereby said slide magazine is selectively moved lengthwise in one direction or a direction opposite thereto.

2. A device according to claim 1, in which said control drum is provided on its circumference with a collar the ends of which are spaced from each other, said control cam being pivotally mounted on said control drum between the ends of said collar, which latter during the rotation of the control drum is guided by said control cam between two of the series of pins on said control disc to hold the latter in the selected rotative position into which it was moved by said control cam.

3. A device according to claim 1, in which said means for rotating said rotary control drum includes a continuously driven clutch member loosely rotatably mounted on a shaft on which said rotary control drum is fixedly mounted, a clutch pawl mounted on said shaft, and means for causing said clutch pawl to engage said clutch member once during each rotation of the latter, so that said control drum is caused to stop after each complete revolution of the same.

4. A device according to claim 1, in which said means for rotating said rotary control drum includes a continuously driven clutch member loosely rotatably mounted on a shaft on which said rotary control drum is fixedly mounted, a clutch pawl mounted on said shaft, means for causing said clutch pawl to engage said clutch member once during each rotation of the latter, so that said control drum is caused to stop after each complete revolution of the same, and manually operated means for controlling said means which causes said clutch pawl to engage said continuously rotating clutch member.

5. A device according to claim 1, in which said means for rotating said rotary control drum includes a continuously driven clutch member loosely rotatably mounted on a shaft on which said rotary control drum is fixedly mounted, a clutch pawl mounted on said shaft, means for causing said clutch pawl to engage said clutch member once during each rotation of the latter, so that said control drum is caused to stop after each complete revolution of the same, and means for selectively arresting the rotative movement of said rotary drum after one half of a revolution and for causing a disengagement of said clutch pawl from said continuously driven clutch member.

6. In a device for intermittently moving a slide magazine provided with a rack bar thereon and arranged on a slide projector, a rotary control drum, means for rotating said drum in one direction, a control cam pivotally mounted on the circumference of said control drum and extending in circumferential direction of the same, a control disc rotatably mounted adjacent said control drum and adapted to be rotated step by step by said control cam upon rotation of said control drum, means for adjusting said control cam selectively into two different positions, in one of which said control disc is rotated in one direction while in the other position of said control cam the control disc is rotated in the opposite direction, gear means operatively connecting said control disc with said rack bar provided on said slide magazine, whereby said slide magazine is selectively moved lengthwise in one direction or a direction opposite thereto, and means cooperating with said gear means for arresting the same in the position into which it was moved by said control disc.

7. In a device for intermittently moving a slide magazine provided with a rack bar thereon and arranged on a slide projector, a rotary control drum, means for rotating said drum in one direction, a control cam pivotally mounted on the circumference of said control drum and extending in circumferential direction of the same, a control disc rotatably mounted adjacent said control drum and adapted to be rotated step by step by said control cam upon rotation of said control drum, means for adjusting said control cam selectively into two different positions, in one of which said control disc is rotated in one direction while in the other position of said control cam the control disc is rotated in the opposite direction, and gear means operatively connecting said control disc with said rack bar provided on said slide magazine, whereby said slide magazine is selectively moved lengthwise in one direction or a direction opposite thereto, said means for adjusting said control cam including a tripping rod extending slidably along the axis of rotation of said control drum, a shaft on which said control cam is fixedly mounted and rotatably supported in said control drum, and an arm on said shaft extending into the path of said tripping rod to be operated by the same when said rod is slidably displaced.

8. A device according to claim 7, including spring means for urging said arm on said shaft into engagement with one end of said tripping rod, and means for engaging the other end of said tripping rod to slidably displace the same.

9. A device according to claim 7, including spring means for urging said arm on said shaft into engagement with one end of said tripping rod, means for engaging the other end of said tripping rod to slidably displace the same, and latching means for releasably locking said tripping rod in the displaced position.

10. A device according to claim 7, including spring means for urging said arm on said shaft into engagement with one end of said tripping rod, and electromagnetically controlled means for engaging the other end of said tripping rod to slidably displace the same.

11. A device according to claim 7, including spring means for urging said arm on said shaft into engagement with one end of said tripping rod, and electromagnetically controlled means for engaging the other end of said tripping rod to slidably displace the same, said electrically controlled means including a pivotally mounted armature adapted to engage said other end of the said tripping rod, and also adapted to close a pair of contacts in an electric circuit, a coupling in said means for rotating said drum controlled by said circuit in such a manner that upon closing said pair of contacts said coupling is rendered operative to rotate said rotary control drum.

12. In a device for intermittently moving a slide magazine provided with a rack bar thereon and arranged on a slide projector, a rotary control drum, means for rotating said drum in one direction, a control cam pivotally mounted on the circumference of said control drum and extending in circumferential direction of the same, a control disc rotatably mounted adjacent said control drum about an axis extending at right angles to the axis of rotation of said control drum and adapted to be rotated step by step by said control cam upon rotation of said control drum, said control disc having on the face directed toward said control drum an annular series of circumferentially spaced pins adapted to be engaged by said control cam, means for adjusting said control cam selectively into two different positions in one of which said control disc is rotated in one direction, while in the other position of sad control cam the control disc is rotated in the opposite direction, and gear means operatively connecting said control disc with said rack bar provided on said slide magazine, whereby said slide magazine is selectively moved lengthwise in one direction or a direction opposite thereto, said means for rotating said rotary control drum including a continuously driven clutch member loosely rotatably mounted on a shaft on which said rotary control drum is fixedly mounted, a clutch pawl mounted on said shaft, and means for causing said clutch pawl to engage said clutch member once during each rotation of the latter, so that said control drum is caused to stop after each complete revolution of the same.

13. In a device for intermittently moving a slide magazine provided with a rack bar thereon and arranged on a slide projector, a rotary control drum, means for rotating said drum in one direction, a control cam pivotally mounted on the circumference of said control drum and extending in circumferential direction of the same, a control disc rotatably mounted adjacent said control drum about an axis extending at right angles to the axis of rotation of said control drum and adapted to be rotated step by step by said control cam upon rotation of said control drum, said control disc having on the face directed toward said control drum an annular series of circumferentially spaced pins adapted to be engaged by said control cam, means for adjusting said control cam selectively into two different positions in one of which said control disc is rotated in one direction, while in the other position of said control cam the control disc is rotated in the opposite direction, gear means operatively connecting said control disc with said rack bar provided on said slide magazine, whereby said slide magazine is selectively moved lengthwise in one direction or a direction opposite thereto, said means for rotating said rotary control drum including a continuously driven clutch member loosely rotatably mounted on a shaft on which said rotary control drum is fixedly mounted, a clutch pawl mounted on said shaft, and means for causing said clutch pawl to engage said clutch member once during each rotation of the latter, so that said control drum is caused to stop after each complete revolution of the same, and means for selectively arresting the rotative movement of said rotary drum after one half of a revolution and for causing a disengagement of said clutch pawl from said continuously driven clutch member.

References Cited in the file of this patent
UNITED STATES PATENTS
2,962,913   Martin _____ Dec. 6, 1960
FOREIGN PATENTS
838,683   Great Britain _____ June 22, 1960